United States Patent
Lindoff et al.

(10) Patent No.: US 11,785,524 B2
(45) Date of Patent: *Oct. 10, 2023

(54) TIMING OF COMPONENT CARRIERS IN MULTI-CARRIER WIRELESS NETWORKS

(71) Applicant: Telefonaktiebolaget LM Ericsson (publ), Stockholm (SE)

(72) Inventors: Bengt Lindoff, Bjärred (SE); Erik Dahlman, Stockholm (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/889,057

(22) Filed: Aug. 16, 2022

(65) Prior Publication Data
US 2022/0394591 A1     Dec. 8, 2022

Related U.S. Application Data

(63) Continuation of application No. 14/168,944, filed on Jan. 30, 2014, now Pat. No. 11,419,034, which is a
(Continued)

(51) Int. Cl.
*H04W 40/16* (2009.01)
*H04W 52/02* (2009.01)
(Continued)

(52) U.S. Cl.
CPC ............. *H04W 40/16* (2013.01); *H04L 5/001* (2013.01); *H04L 5/0044* (2013.01);
(Continued)

(58) Field of Classification Search
CPC ..... H04L 5/001; H04L 5/0044; H04L 5/0053; H04L 5/0094; H04L 5/0098; H04W 52/0229; H04W 40/16; H04W 76/15
See application file for complete search history.

(56) References Cited

U.S. PATENT DOCUMENTS 6,584,084 B1   6/2003   Barany et al.
6,934,346 B2   8/2005   Lindoff et al.
(Continued)

FOREIGN PATENT DOCUMENTS

CN        1885759 A    12/2006
CN    101185260 A     5/2008
(Continued)

OTHER PUBLICATIONS

Attar et al., "Evolution of cdma2000 Cellular Networks: Multicarrier EV-DO", Topics in Radio Communication, IEEE Communications Magazine, pp. 46-52, Mar. 2006.

*Primary Examiner* — Gary Mui (57) ABSTRACT

Mechanisms for efficient transmission of large amount of download data from a base station to a user equipment in a multi-carrier that minimizes power consumption on the user equipment are described. When multiple component carriers are to be used to transmit the download data, the base station informs the user equipment. The base station transmits on the anchor carriers without wait after informing the user equipment and transmits on the non-anchor carriers after waiting a predetermined delay. The predetermined delay provides time to allow the user equipment to activate the receiving resources and be ready to receive the download data over the non-anchor carriers. In this manner, the user equipment can be in a power conservation mode and activate the receiver resources only when needed.

18 Claims, 11 Drawing Sheets

Related U.S. Application Data continuation of application No. 12/934,137, filed as application No. PCT/SE2008/050990 on Sep. 3, 2008, now Pat. No. 8,676,240.

(60) Provisional application No. 61/039,223, filed on Mar. 25, 2008.

(51) Int. Cl.
*H04L 5/00* (2006.01)
*H04W 76/15* (2018.01)
*H04W 72/00* (2023.01)

(52) U.S. Cl.
CPC .......... *H04L 5/0053* (2013.01); *H04L 5/0094* (2013.01); *H04W 52/0229* (2013.01); *H04W 76/15* (2018.02); *H04L 5/0098* (2013.01); *H04W 72/00* (2013.01); *Y02D 30/70* (2020.08)

(56) References Cited

U.S. PATENT DOCUMENTS

| | | | |
|---|---|---|---|
| 6,990,324 | B2 | 1/2006 | Laroia et al. |
| 7,292,862 | B2 | 11/2007 | Sumasu et al. |
| 8,180,360 | B2 | 5/2012 | Yang et al. |
| 8,526,377 | B2 | 9/2013 | Lindoff et al. |
| 8,737,402 | B2 | 5/2014 | Axnäs et al. |
| 9,055,572 | B2 | 6/2015 | Aiba et al. |
| 2004/0125743 | A1 | 7/2004 | Hashem et al. |
| 2005/0136934 | A1 | 6/2005 | Alard |
| 2006/0002421 | A1 | 1/2006 | Kuwahara et al. |
| 2006/0077931 | A1 | 4/2006 | Lee et al. |
| 2006/0153128 | A1 | 7/2006 | Frederiksen et al. |
| 2006/0193338 | A1 | 8/2006 | Zheng et al. |
| 2006/0221894 | A1 | 10/2006 | Casaccia et al. |
| 2007/0153729 | A1 | 7/2007 | Alapuranen |
| 2007/0167160 | A1 | 7/2007 | Asanuma et al. |
| 2007/0211616 | A1 | 9/2007 | Khandekar et al. |
| 2007/0218918 | A1 | 9/2007 | Liu et al. |
| 2007/0286299 | A1 | 12/2007 | Brunel et al. |
| 2008/0205348 | A1 | 8/2008 | Malladi |
| 2008/0287068 | A1 | 11/2008 | Etemad |
| 2008/0299985 | A1 | 12/2008 | Yang et al. |
| 2011/0111785 | A1 | 5/2011 | Lindoff et al. |
| 2012/0134330 | A1 | 5/2012 | Yoon et al. |
| 2012/0182879 | A1 | 7/2012 | Tamura et al. |

FOREIGN PATENT DOCUMENTS

| | | |
|---|---|---|
| CN | 1893343 A | 5/2010 |
| EP | 1895697 A1 | 3/2008 |
| JP | 8065731 A | 3/1996 |
| JP | 2001230744 A | 8/2001 |
| JP | 2006211067 A2 | 8/2006 |
| JP | 2008539667 A | 11/2008 |
| WO | 2005043794 A2 | 5/2005 |
| WO | 2006020169 A3 | 2/2006 |
| WO | 2006090257 A1 | 8/2006 |
| WO | 2006106382 A1 | 10/2006 |
| WO | 2006116102 A2 | 11/2006 |
| WO | 2006126079 A2 | 11/2006 |
| WO | 2006126085 A1 | 11/2006 |
| WO | 2007003122 A1 | 1/2007 |
| WO | 2007117100 A1 | 10/2007 |
| WO | 2008024788 A2 | 2/2008 |

TIMING OF COMPONENT CARRIERS IN MULTI-CARRIER WIRELESS NETWORKS

RELATED APPLICATIONS

This application is a continuation application of U.S. patent application Ser. No. 14/168,944, filed Jan. 30, 2014, granted as U.S. Pat. No. 11,419,034 on Aug. 16, 2022, which is a continuation application of U.S. patent application Ser. No. 12/934,137, filed Dec. 20, 2010, granted as U.S. Pat. No. 8,676,240 on Mar. 18, 2014, which is a National Stage Entry of International Patent Application No. PCT/SE2008/050990, filed Sep. 3, 2008, which claims priority to and the benefit of U.S. Provisional Patent Application No. 61/039,223, filed Mar. 25, 2008, the disclosures of which are hereby incorporated herein by reference in their entireties.

TECHNICAL FIELD

The disclosed technology relates to timing of component carriers for use in communications between a user equipment and a base station in a wireless network.

BACKGROUND

Evolution of cellular systems promise significant data rate increase in the future, to 1 Gb/s and higher. Higher data rates typically require larger system bandwidths. For the IMT (International Mobile Telecommunications) advanced (i.e. the fourth generation mobile communication) systems, bandwidths up to 100 MHz are being discussed. Unfortunately, the radio spectrum is a limited resource and since many operators and systems need to share the same radio resource, finding a free 100 MHz contiguous spectrum is problematic.

Figure 1:
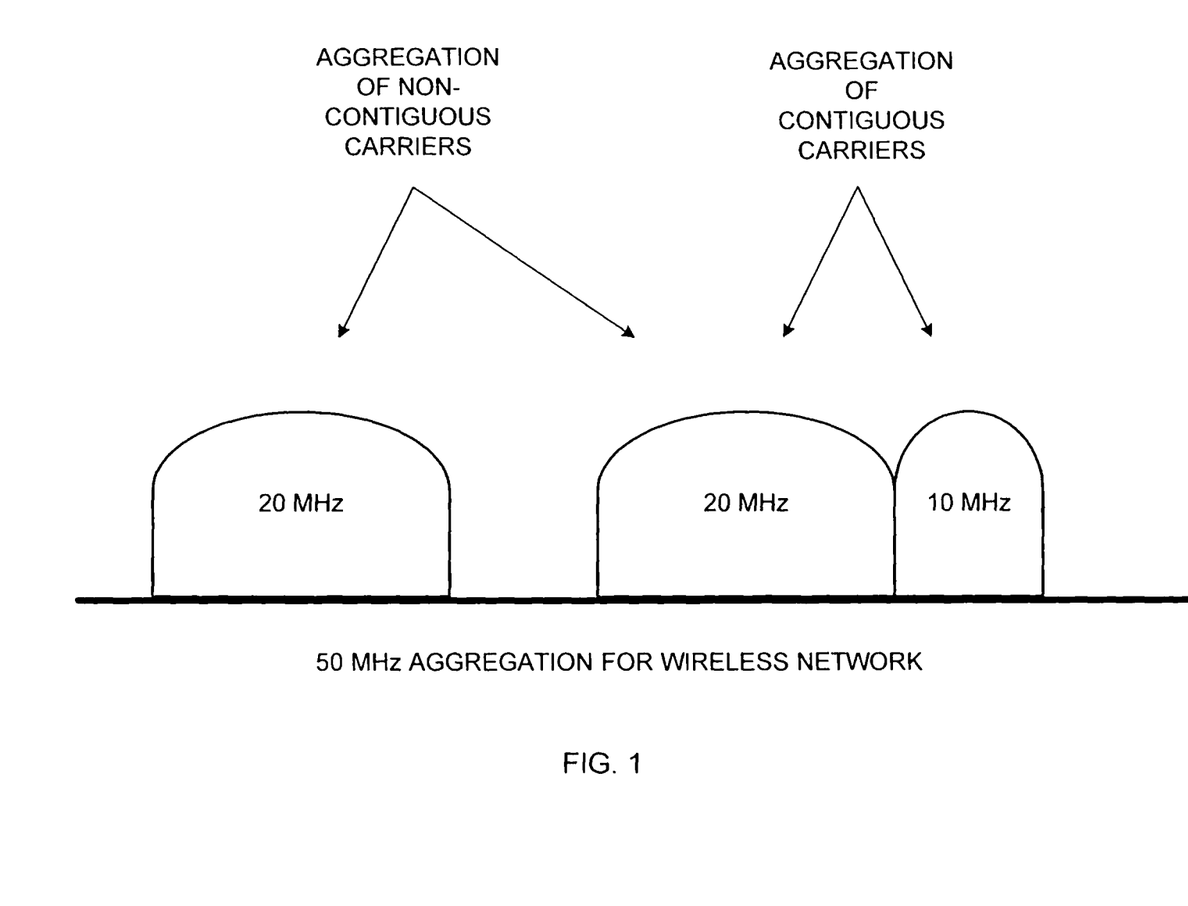
FIG. 1 illustrates an example aggregation of multiple narrow bandwidth carriers to an aggregated wide bandwidth carrier.

One way to address this issue is to aggregate multiple narrow bandwidths (or component carriers) as illustrated in FIG. 1, which can be contiguous or non-contiguous to aggregately achieve the wide bandwidth. In the example of FIG. 1, a 50 MHz bandwidth spectrum is achieved by aggregating individual narrower bandwidth component carriers, which in this instance are 20 MHz, 20 MHz, and 10 MHz wide component carriers. One benefit of such a solution is that it is possible to generate sufficiently large bandwidth for supporting data rates up to and above 1 Gb/s. Furthermore, this solution also makes it possible to adapt the spectrum parts to various situations and geographical positions thus making such solution very flexible.

A straightforward evolution of current cellular systems, such as LTE (Long Term Evolution), to support contiguous and non-contiguous spectrum is to introduce multi-carriers. That is, for each spectrum "chunk" representing a "legacy LTE" system carrier, a "4G" user equipment can be made to be capable of receiving multiple number of LTE carriers of different bandwidths transmitted at different carrier frequencies.

Although this approach seems to be straightforward, it is a non-trivial task to design an LTE advanced capable user equipment. The aggregated spectrum approach implies that the radio receiver architecture for the user equipment will become more complicated than for a user equipment that is capable of only receiving small and contiguous system bandwidths. The reason is that the front end radio needs to be able to suppress blocking signal in between the spectrum "chunks". Different kind of radio architecture can be used to handle this problem. However, they typically accompany drawbacks in terms of power consumption compared to standard continuous system bandwidth receivers.

SUMMARY

One aspect of the invention is to provide a mechanism for efficient transmission of large amount of DL (download) data from a base station to a user equipment in a multi-carrier environment that minimizes power consumption on the user equipment. In this aspect, the base station is capable of transmitting and the user equipment is capable of receiving signals (control and data) on a plurality of component carriers. One or more of the plurality of carriers are used to carry control signals from the base station to the user equipment. That is, one or more carriers are anchor carriers for the user equipment. On the user equipment side, one or more receivers that are configured to receive signals on the component carriers other than the anchor carriers can be put into a power conservation mode.

When it is decided that a large amount of DL data needs to be transmitted from the base station to the user equipment in a relatively short time, the base station divides the DL data in a plurality of data parts and transmits each data part over separate component carriers. The data parts can be transmitted to overlap each other in time. That is, the data parts can be transmitted simultaneously.

To accomplish this task, the base station first notifies the user equipment that the DL data will be transferred over multiple component carriers. If any of the selected carriers is an anchor carrier for the user equipment, then the data part corresponding to the anchor carrier can be transmitted immediately since the user equipment is already actively listening on the carrier.

However, if any of the selected component carriers is not an anchor carrier, the base station waits a predetermined delay after notifying the user equipment. In effect, a time offset is introduced between the selected anchor and non-anchor carriers. In a simple instance when one anchor carrier and one non-anchor carrier are selected, the time offset between two carriers can be about one-half TTI (transmission time interval).

The predetermined delay provides sufficient time for the user equipment to prepare itself to receive the DL data over the corresponding non-anchor carrier. For example, the user equipment can turn on or otherwise activate a fixed bandwidth receiver arranged to listen on the corresponding non-anchor carrier. As another example, the user equipment can configure an adaptable bandwidth receiver to receive on the selected non-anchor carrier.

Other information can be provided to the user equipment by the base station. For example, the base station can provide information regarding the RBs (resource blocks) of the selected component carriers that are allocated to carry the DL data. The information regarding the RBs of the non-anchor carrier can be provided over the anchor carrier or over the corresponding non-anchor carrier. The information on the RBs can be provided on a PDCCH (physical downlink control channel) of the anchor and/or the non-anchor carriers.

In other instances, it may be decided that no anchor carriers will be used to transfer the DL data. That is, it may be decided that one or more non-anchor component carriers will be used. When this occurs, it is preferred that the base station wait the predetermined delay after notifying the user equipment before transferring the DL data on the non-anchor component carriers. There may be a host of reasons for using the non-anchor component carriers. For example, the quality of the non-anchor carriers may be better than the anchor carriers.

One advantage of introducing the time offset on the different component carriers is that an optimum trade off between the user equipment power consumption and the DL data throughput can be achieved. Another advantage is that the reliability of the system may be enhanced by allowing transfer over non-anchor carriers.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

In a system such as the LTE, scaleable carrier bandwidths of 5, 10, 15 and 20 MHz are supported. Component carriers with bandwidths smaller than 5 MHz can be supported for increased flexibility. The downlink transmission scheme can be based on OFDM (orthogonal frequency division multiplex). In an OFDM system, the available component carrier bandwidth is divided into a plurality of sub-carriers that are orthogonal to each other. Each of these sub-carriers is independently modulated by a low rate data stream. In LTE, the normal spacing between adjacent sub-carriers is 15 kHz, that is, $\Delta f=15$ kHz. Sub-carrier spacing of $\Delta f=7.5$ kHz is also supported. Downlink access for user equipments can be provided through OFDMA (orthogonal frequency division multiple access) in which different groupings of sub-carriers are allocated to different user equipments.

Data is allocated to the user equipments in terms of RBs (resource blocks) which is defined in both frequency and time domains. For the normal sub-carrier spacing $\Delta f=15$ kHz, a physical RB includes 12 consecutive sub-carriers in the frequency domain. In the time domain, the physical block includes 7 consecutive OFDM symbols for a total of 94 REs (resource elements), which is the number of symbols available in a slot (0.5 ms in duration). The resource block size is the same for all bandwidths, therefore the number of available physical resource blocks depends on the bandwidth of the component carrier. Depending on the required DL data rate, each user equipment can be assigned one or more resource blocks in each TTI (transmission time interval) of 1 ms.

In a wireless network, the base station is able to transmit and the user equipment is able to receive signals (data and control) carried over a plurality of component carriers, where each component carrier can have the characteristics as discussed above. In a multi-carrier system such as LTE, the plurality of component carriers need not be contiguous. That is, there can be at least one gap in a frequency spectrum represented by the plurality of carriers as illustrated in FIG. 1.

Figure 2:
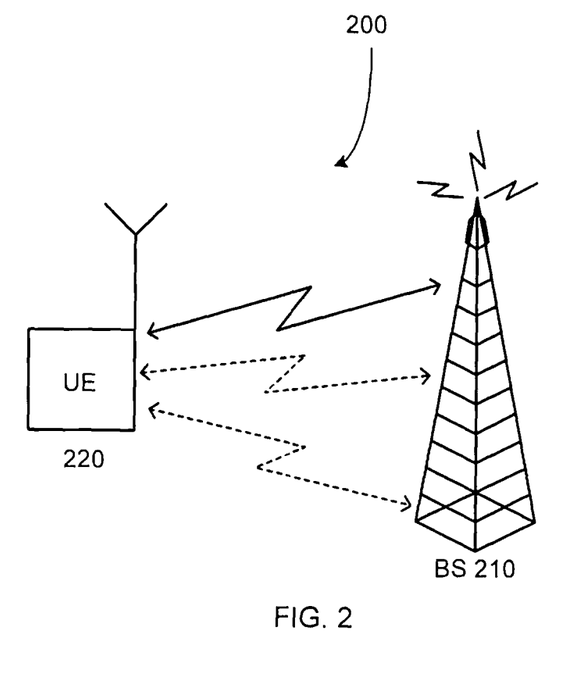
FIG. 2 illustrates an embodiment of a wireless network in which the component carrier timing can be accomplished.

FIG. 2 illustrates an example embodiment of a wireless network 200 in which component carrier timings can be practiced. For simplicity of explanation, the network 200 in FIG. 2 includes one base station 210 and one user equipment 220. Note that the concepts discussed are extendible to multiple base stations 210 and multiple user equipments 220. The bi-directional zigzag arrowed lines between the base station 210 and the user equipment 220 each represent a component carrier of an aggregated wide bandwidth spectrum. In this particular example, there are three component carriers, one of which is being used as an anchor carrier (the solid arrowed line) and two of which are non-anchor carriers.

The anchor carrier carries control signals, such as the L1/L2 control signals, from the base station 210 to the user equipment 220. The control signals inform the user equipment 220 regarding specific downlink and uplink resources (such as identification of resource blocks of the component carriers) scheduled for the user equipment, modulation scheme to be used, the user equipment transmission power level, and so on.

In FIG. 2, it is assumed that the user equipment 220 is equipped to receive signals carried over the plurality of component carriers. For example, the user equipment 220 may include at least three fixed bandwidth receivers each configured to receive signals on one of the three component carriers. Assuming that there is no data being transferred between the base station 210 and the user equipment 220 on the non-anchor carriers, it is desirable to put the receivers that correspond to the non-anchor carriers in a power conservation mode. Power conservation mode includes turning off the receiver, putting the receiver in a periodic monitoring mode, and enabling a DRX (discontinuous reception) mode, and so on.

In another example, the user equipment 220 may include one or more adaptable bandwidth receivers. An adaptable bandwidth receiver is a receiver whose frequency range can be dynamically adjusted as the need arises. In this instance, putting the receiver into the power conservation mode can also include narrowing the frequency range of the adaptable receiver to exclude the non-anchor carriers. By narrowing the frequency range, less power is consumed. Of course, the user equipment 220 can include both fixed and adaptable bandwidth receivers.

Figure 3:
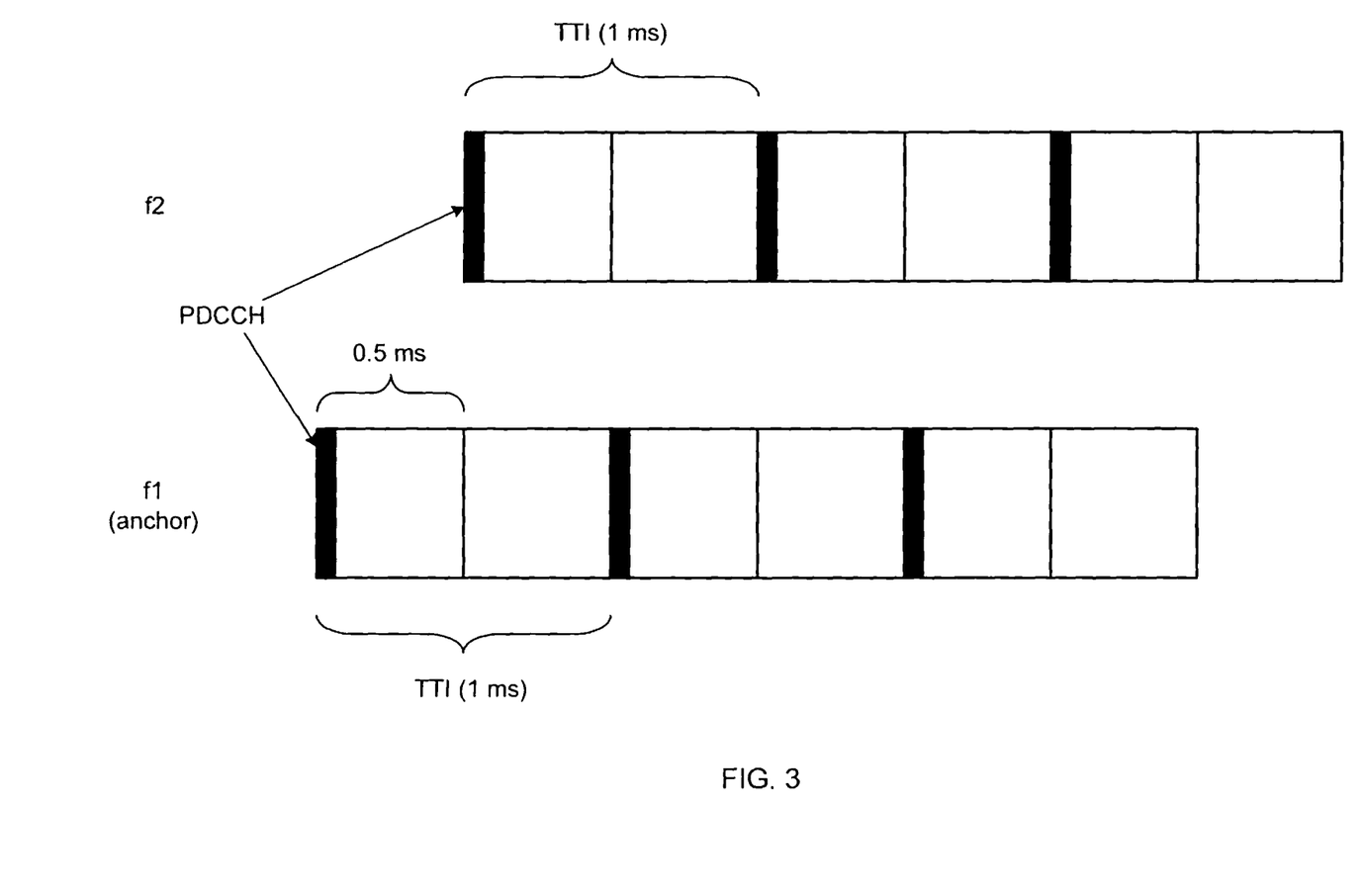
FIG. 3 illustrates an example timing offset between two component carriers carrying DL data.

When it is decided that a large amount of DL (download) data will be transferred from the base station 210 to the user equipment 220 in a relatively short time, that is when it is decided that a large DL data transfer bandwidth is required, multiple carriers can be used for this purpose. For explanation, FIG. 3 illustrates a situation where the DL data is divided into first and second data parts (for ease of explanation) which can be carried over first and second component carriers, respectively. In FIG. 3, frames of component carriers f1 and f2 are illustrated. The component carrier f1 is assumed to be an anchor carrier and the component carrier f2 is assumed to be a non-anchor carrier.

For explanation purposes, it is assumed that the user equipment 220 is actively listening for signals on the carrier f1 but is not actively listening for signals on the carrier f2. If the user equipment 220 includes multiple fixed bandwidth receivers, than the receiver configured to listen to the carrier f1 (first receiver) can be active and the receiver configured to listen to the carrier f2 (second receiver) can be in the power save mode. If the user equipment 220 includes an adaptable bandwidth receiver, the frequency range of the adaptive receiver can be adjusted to actively listen for the carrier f1 and exclude listening for the carrier f2.

For LTE carriers, a TTI (transmission time interval) length of 1 ms consists of two slots each 0.5 ms long. The control signaling such as PDCCH (physical downlink control channel) and PHICH (physical HARQ indicator channel) are provided within first three OFDM (orthogonal frequency division multiplex) symbols. A typical PDCCH decoding time is about 100-150 μs. When a large DL data is to be received, the user equipment 220 can turn on or otherwise active the receiver for the second carrier. In case of adaptable bandwidth receivers, the frequency range of the receiver can be adjusted to include the second carrier.

It is preferred that the base station 210 wait a predetermined delay prior to transmitting the second data part over the second carrier. In other words, a timing offset should be introduced between the transmission on the anchor carrier and the non-anchor carrier as illustrated in FIG. 3. In this particular instance, the timing offsets amounts to one-half TTI. However, this is not the only possibility. When data parts are to be transferred over non-anchor carriers, it is only necessary for the predetermined delay be at least as long as an amount of time the user equipment 220 needs to prepare to receive signals on that non-anchor carrier.

Figure 4:
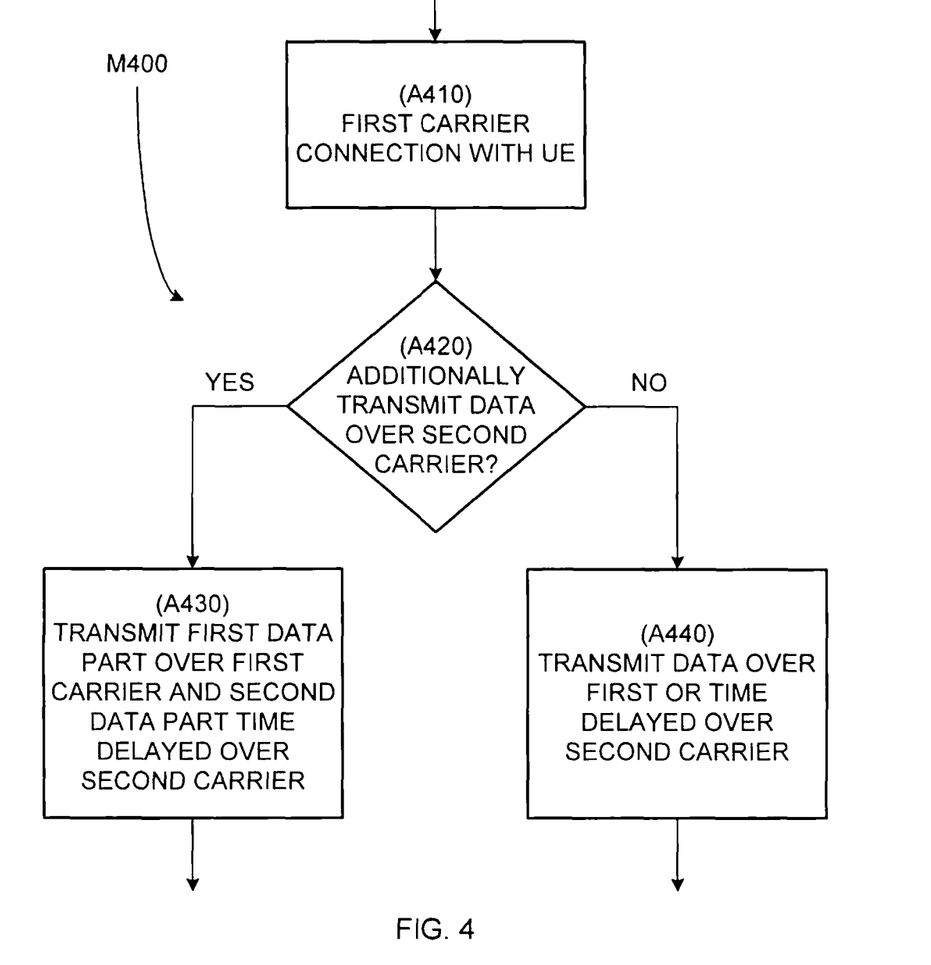
FIG. 4 illustrates an example method to determine whether the DL data should be transferred over multiple component carriers.

FIG. 4 illustrates an example method M400 to determine whether the DL data should be transferred over multiple component carriers. The method M400 is from the perspective of the base station 210. In A410 of the method, the base station 210 establishes a connection with the user equipment 220 over one or more anchor carriers. In this method, it is assumed that a first carrier is one of the anchor carriers.

In A420, the base station 210 makes a determination whether a wide DL data transfer bandwidth is needed. That is, the base station 210 determines whether the DL data destined to the user equipment 220 should be transferred over the first carrier and additionally over at least a second carrier, which is a non-anchor carrier. If so, then in A430, the base station 210 transmits first and second data parts of the DL data over the first and second carriers, respectively. There is a predetermined delay between the transmissions over the first and second carriers. As explained above, the predetermined delay is an amount of time sufficient for the user equipment 220 to prepare to receive the DL data over the second carrier. As seen in FIG. 3, after the predetermined delay, the first and second data parts are transferred simultaneously which effectively increases the data transfer bandwidth.

Figure 5:
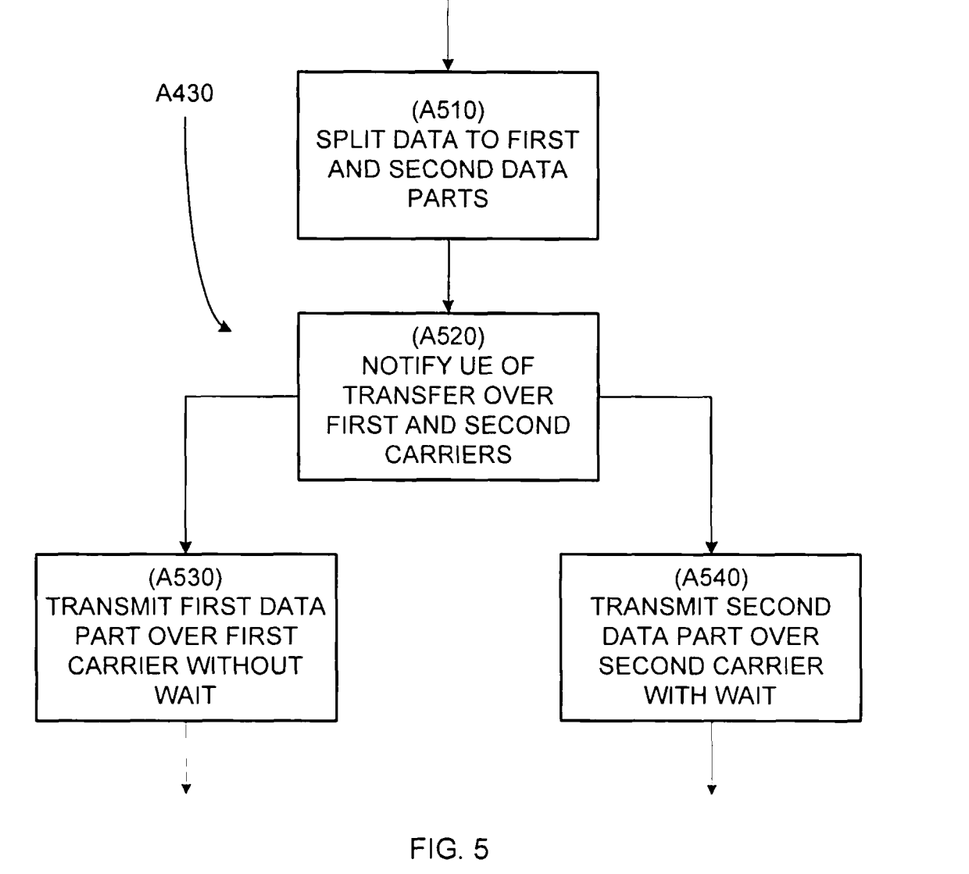
FIG. 5 illustrates an example method to determine timings of transmissions on different component carriers.

FIG. 5 illustrates an example method to implement A430 of FIG. 4 of transmitting the DL data over the first and second carriers. In A510, the base station 210 splits the DL data into the first and second data parts. Then in A520, the base station 210 notifies the user equipment 220 of the DL data transmission over the first and second carriers. In A530, the first data part is transmitted over the first carrier, and in A540, the second data part is transmitted over the second carrier.

In A530, the first data part is transmitted immediately after notifying the user equipment 220, i.e., the first data part is transmitted without wait. Since the first carrier is one of the anchor carriers for the user equipment 220, the user equipment 220 is already actively listening for signals on that carrier. Thus, there is no need to wait.

In contrast, the second carrier is not one of the anchor carriers. Therefore, it is possible that the user equipment 220 is not actively listening on the second carrier due to being in power conservation mode. So in A540, the predetermined delay is waited prior to the base station 210 transmitting the second data part over the second carrier.

Going back to A520, the base station 210 may choose which component carriers will be used including the first and second carriers to transfer the DL data. To prepare the user equipment 220, the base station notifies the user equipment 220 of the choice of carriers. In the notification, information regarding one or more resource blocks of the second carrier allocated to carry the second data part can be further included.

Figure 6:
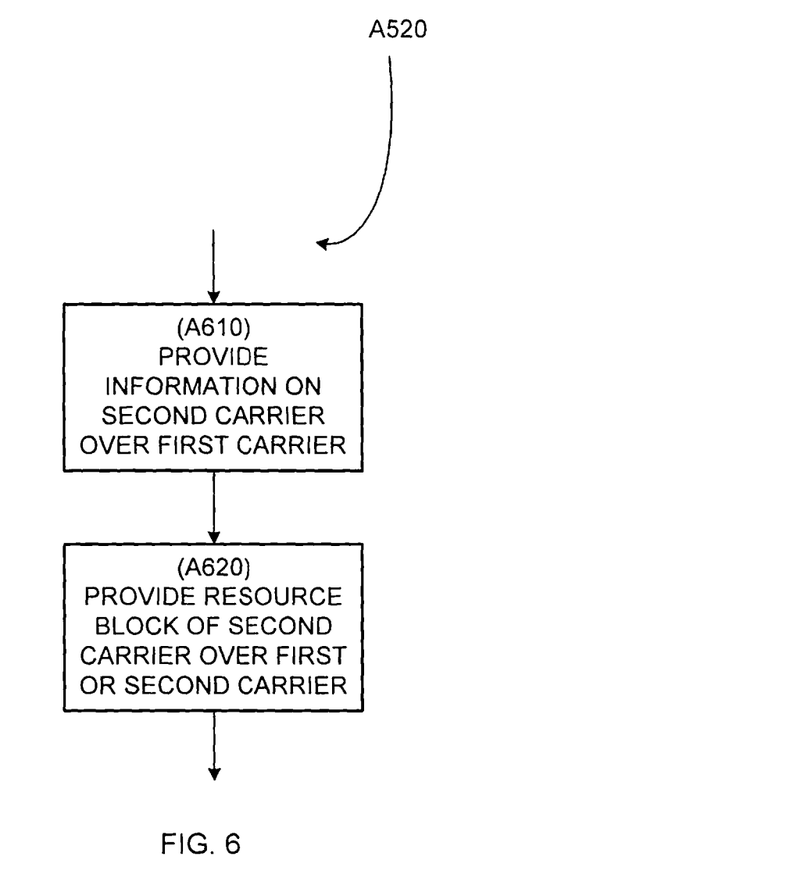
FIG. 6 illustrates an example method to notify the user equipment regarding the resources of the component carriers allocated to transfer the DL data.

FIG. 6 illustrates an example method to implement A520, that is to notify the user equipment 220. In the method, the base station 210 provides the information on the second carrier over the first carrier in A610. Then in A620, the base station also provides the resource block information of the second carrier over either the first or the second carrier.

In one embodiment, information regarding the second carrier and the RBs (resource blocks) of the second carrier are provided over the first carrier. As an example, the base station 210 may reserve a portion of a PDSCH (physical downlink shared channel) of the first carrier to provide the information. In an embodiment, the base station 210 provides the information over a PDCCH (physical downlink control channel) of the first carrier. In another embodiment, identification of the second carrier is provided over the first carrier (e.g., in the PDSCH or PDCCH) and the information regarding the resource blocks of the second carrier is provided over the second carrier itself, for example, over the PDCCH of the second carrier.

Referring back to FIG. 4, the base station 210 may determine that the wide DL data transfer bandwidth is not needed in A420. That is, the base station 210 may determine that one of the first or the second component carrier is sufficient for the DL data transfer. When this occurs, the base station 210 transmits the DL data over either the first or the second carrier in A440. If it is decided to transfer the DL data over the first carrier, then the base station 210 may do so without waiting any delay. If it is decided that the second carrier will be used, then the base station 210 can wait before transmitting.

The base station 210 may decide to transfer the DL data over the second (i.e., non-anchor) carrier instead of over the first (i.e., anchor) carrier even though a wait is involved. There are a host of reasons why such a decision may be made. In general if the non-anchor carrier is better suited, i.e., the quality of the second carrier is better, then it may be advantageous to use the second carrier since it is more reliable. As an example of a quality measurements, a CQI (channel quality indicator) of the second carrier may be higher than the CQI of the first carrier. Other examples of quality measurements can be based on signal-to-interference (SIR) ratio (higher the better), a received signal reference power (RSRP) (higher the better), a data transmission rate (higher the better), an error rate (lower the better), repeat request rate (lower the better), and so on.

In addition to quality considerations, the network system capacity may also factor into the decision. In one example, the first carrier may be overutilized relative to the second carrier. Thus, a consideration for switching to a second carrier may be that a remaining data carrying capacity of the second carrier is greater than a remaining data carrying capacity of the first carrier by a predetermined amount.

Figure 7:
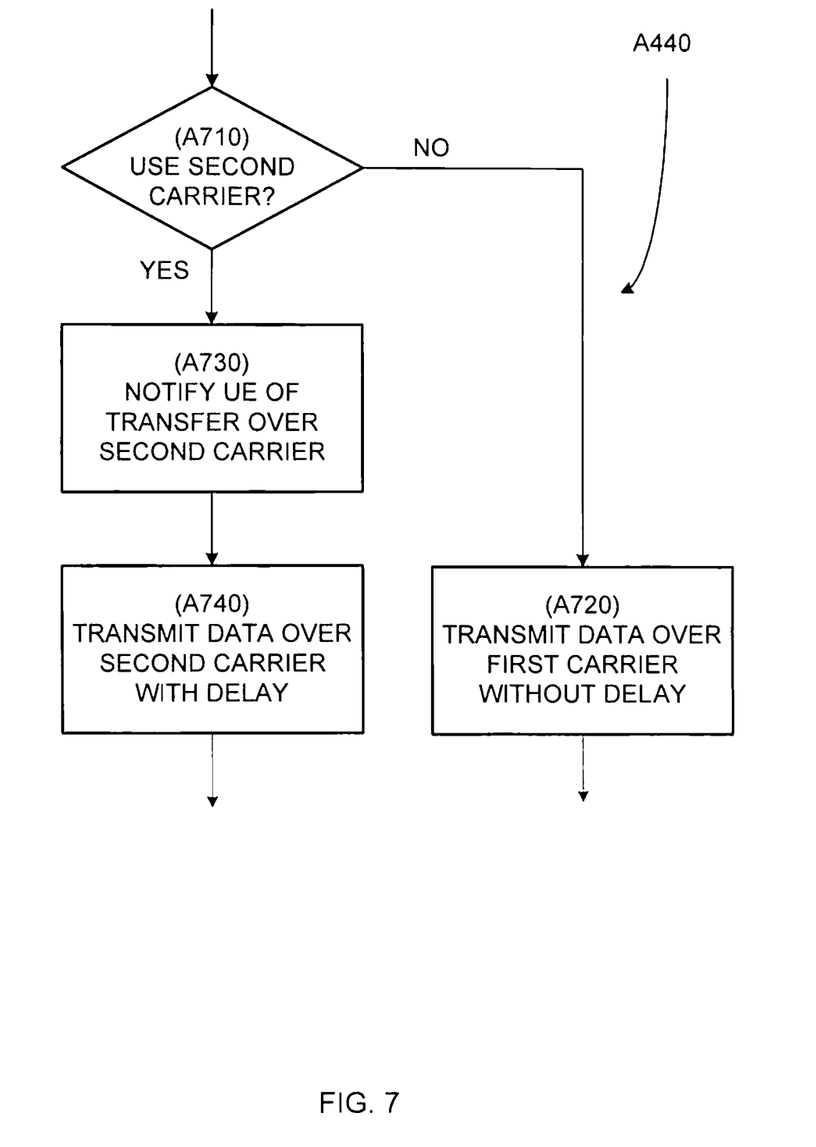
FIG. 7 illustrates an example method to transfer the DL data over either an anchor carrier or a non-anchor carrier.

FIG. 7 illustrates an example method to implement A440 of FIG. 4 of transferring the DL data over either the anchor carrier (the first carrier) or the non-anchor carrier (the second carrier). In A710, the base station 210 decides whether the second carrier should be used to transfer the DL data instead of the first carrier based on the considerations discussed above. If it is decided not to use the second carrier, the base station 210 transmits the DL data over the first carrier without delay as depicted in A720. If it is decided to use the second carrier, then in A730, the base station 210 notifies the user equipment 220 of the transfer of the DL data over the second carrier. Then after waiting the predetermined delay, the base station 210 transmits the DL data over the second carrier in A740.

Figure 8:
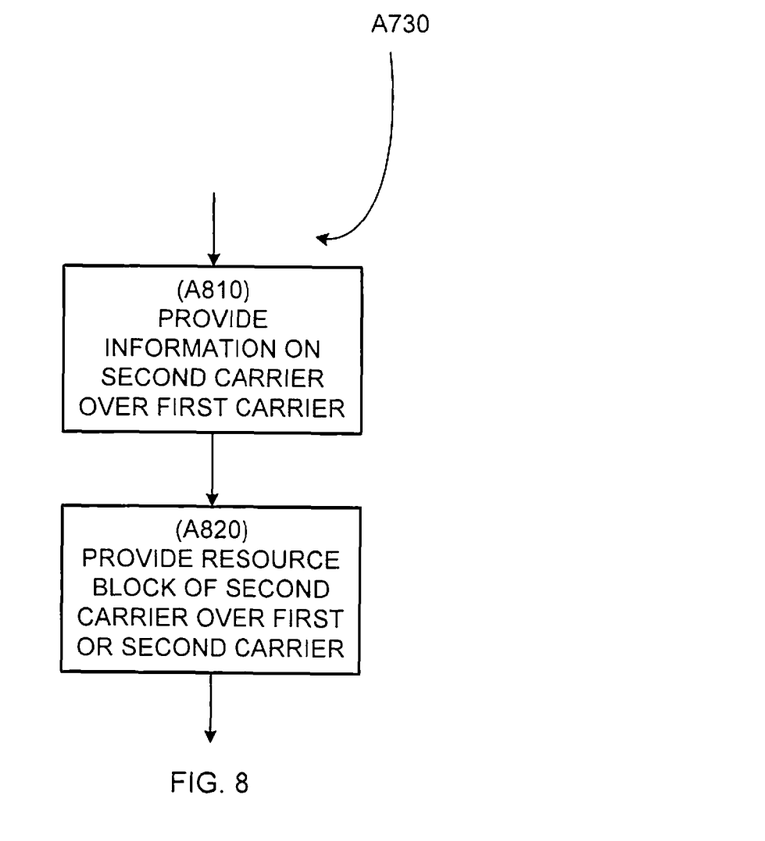
FIG. 8 illustrates an example method to notify the user equipment regarding the resources of the non-anchor component carrier allocated to transfer the DL data.

FIG. 8 illustrates an example method to implement A730 to notify the user equipment 220 regarding the transfer of the DL data over the second carrier. In A810, the base station 210 informs the user equipment 220 regarding the second carrier over the first carrier. Then in A820, information on the resource blocks of the second carrier allocated to carry the DL data is provided over either the first carrier (e.g., in the PDSCH or the PDCCH) or second carrier (e.g., in the PDCCH).

Figure 9:
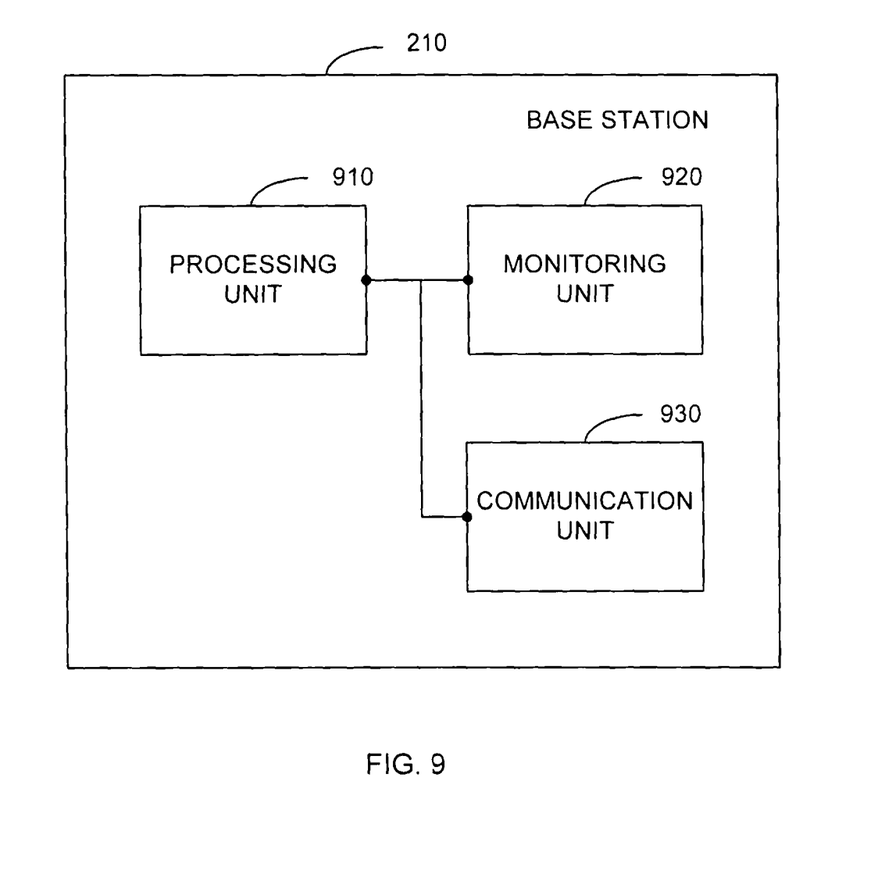
FIG. 9 illustrates an embodiment of a base station.

FIG. 9 illustrates the embodiment of the base station 210 depicted in FIG. 2. The base station 210 includes a processing unit 910, a monitoring unit 920 and a communication unit 930. The monitoring unit 910 is arranged to monitor, e.g., loads on the component carriers used by the base station 210. The communication unit 930 is arranged to communicate with the user equipment 220 in the network 200. The processing unit 910 is arranged to control the operations of the components of the base station 210 to perform the methods as described above.

Figure 10:
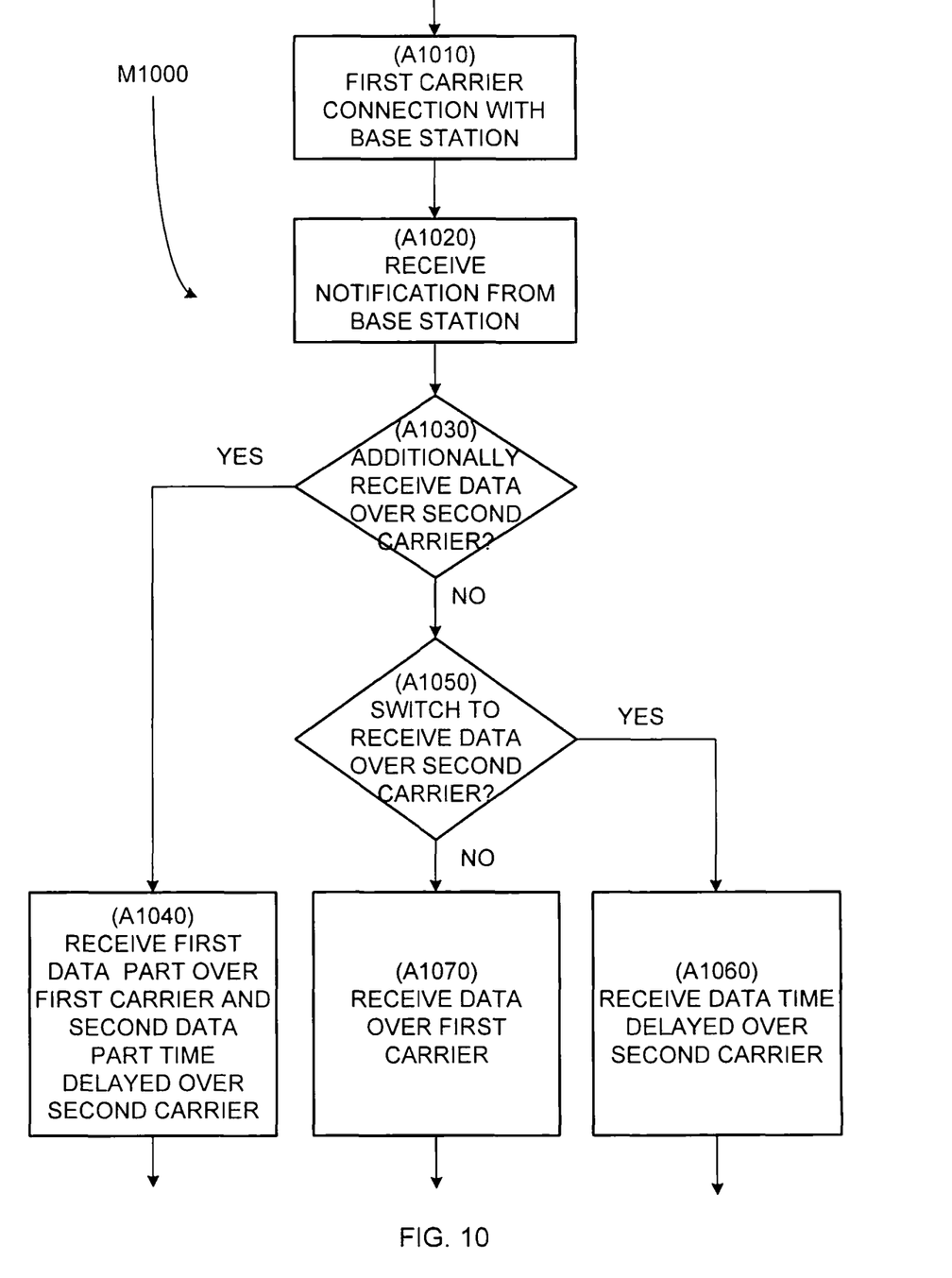
FIG. 10 illustrates an example method to receive the DL data from a perspective of the user equipment.

FIG. 10 illustrates an example method M1000 from the perspective of the user equipment 220, to receive the DL data from the base station 210. In A1010 of the method, the user equipment 220 establishes a connection over one or more anchor carriers with the base station 210 including the first carrier. In A1020, the user equipment 220 receives a notification from the base station 210 regarding the DL data transfer. In A1030, based on the notification, the user equipment 220 determines whether the base station will transfer the DL data over the first carrier and additionally over the second (non-anchor) carrier. If the user equipment 220 makes such determination, then in A1040, the user equipment 220 activates the receivers to receive the first data part of the DL data over the first carrier and the second data part over the second carrier. In A1040, the user equipment 220 actively prepares the receivers so that it can be ready to receive the signals on the second carrier after the predetermined delay.

If it is determined in A1030 that the DL data will not be carried over multiple component carriers, then the user equipment 220 determines whether the base station 210 will transmit the DL data over the first or the second carrier in A1050. If it is determined that the DL data will be received over the first carrier, then in A1070, the user equipment 220 receives data without delay. However, if it is determined that the DL data will be received over the second carrier, then in A1060, the user equipment 220 actively prepares the receivers so that it is ready to receive the DL data over the second carrier on or before the predetermined delay passes since receiving the notification.

Figure 11:
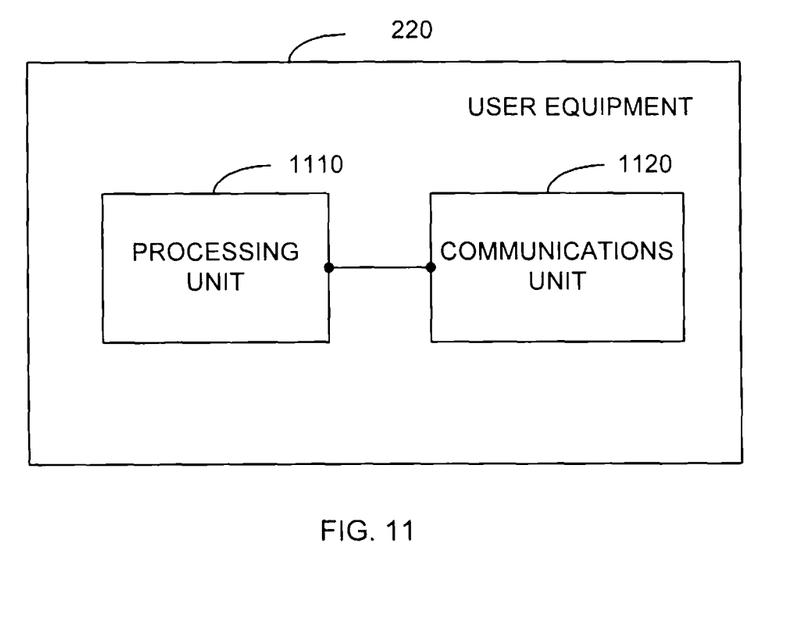
FIG. 11 illustrates an embodiment of a user equipment.

FIG. 11 illustrates an embodiment of the user equipment 220. The user equipment 220 includes a processing unit 1110 and a communications unit 1120. The communications unit 1120 is arranged to communicate with the base station 210 in the network 200. The communications unit 1120 can include any combination of fixed narrow bandwidth receivers and adaptable bandwidth receivers. If only fixed bandwidth receivers are considered, then the communications unit 1230 is preferred to include a plurality of receivers, where each receiver is configured to listen on one of the plurality of component carriers. If only adaptable bandwidth receivers are considered, then there can be one or more of these receivers. If a combination is considered, then there can be one or more fixed bandwidth receivers and one or more adaptable bandwidth receivers. The processing unit 1110 is arranged to control the operations of the components of the user equipment 220 to perform the methods described above.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public.

What is claimed is:

1. A method in a base station of a wireless network for transmitting download (DL) data to a user equipment of the wireless network, the method comprising:
   establishing, by the base station, a connection over a first carrier, wherein the first carrier is used to provide control signals from the base station to the user equipment;
   determining whether the DL data destined to the user equipment should be additionally transferred over a second carrier; and
   transmitting the DL data over the first and second carriers when it is determined that the second carrier should be additionally used,
   wherein the act of transmitting the DL data over the first and second carriers comprises:
      splitting the DL data into at least first and second data parts;
      notifying the user equipment of the DL data transmission including providing an identification of the second carrier over the first carrier;
      transmitting the first data part over the first carrier; and
      transmitting the second data part over the second carrier after waiting a predetermined delay, and
   wherein the predetermined delay is an amount of time sufficient for the user equipment to prepare to receive over the second carrier.

2. The method of claim 1, wherein the second carrier is not used to provide control signals from the base station to the user equipment.

3. The method of claim 1,
   wherein the act of notifying the user equipment comprises providing, over the first carrier or the second carrier, information regarding resource blocks (RBs) of the second carrier allocated to carry the second data part, and
   wherein the information regarding the RBs is provided on a physical downlink shared channel (PDSCH) or on a physical downlink control channel (PDCCH) of the first carrier or on the PDCCH of the second carrier.

4. The method of claim 1, further comprising:
   transmitting the DL data over the first or the second carrier when it is determined that the second carrier should not be additionally used,
   wherein when the DL data is transmitted over the second carrier, the DL data is transmitted after the predetermined delay.

5. The method of claim 4, wherein in the act of transmitting the DL data over the first or the second carrier, it is determined that the DL data should be carried over the second carrier when any one or more of the following is true:
   a channel quality of the second carrier is higher than a channel quality of the first carrier,
   a signal-to-interference ratio (SIR) of the second carrier is higher than a SIR of the first carrier,
   a received signal reference power (RSRP) of the second carrier is higher than a RSRP of the first carrier,
   a data transmission rate of the second carrier is higher than a data transmission rate of the first carrier,
   an error rate of the second carrier is lower than an error rate of the first carrier, and
   a remaining data carrying capacity of the second carrier is more than a remaining data carrying capacity of the first carrier.

6. A base station, comprising:
   a communications unit arranged to communicate with a user equipment; and
   a processing unit arranged to:
   establish, via the communications unit, a connection over a first carrier, wherein the first carrier is used to provide control signals from the base station to the user equipment;
   determining whether download (DL) data destined to the user equipment should be additionally transferred over a second carrier; and
   transmit, via the communications unit, the DL data over the first and second carriers when it is determined that the second carrier should be additionally used,
   wherein the processing unit is arranged to transmit the DL data over the first and second carriers by splitting the DL data into at least first and second data parts, notifying, via the communications unit, the user equipment of the DL data transmission including providing an identification of the second carrier over the first carrier, and transmitting the first data part over the first carrier and the second data part over the second carrier,
   wherein the second data part is transmitted over the second carrier after waiting a predetermined delay, and
   wherein the predetermined delay is an amount of time sufficient for the user equipment to prepare to receive over the second carrier.

7. The base station of claim 6, wherein the second carrier is not used to provide control signals from the base station to the user equipment.

8. The base station of claim 6,
   wherein the processing unit is arranged to provide, over the first carrier or the second carrier, information regarding resource blocks (RBs) of the second carrier allocated to carry the second data part, and
   wherein the information regarding the RBs is provided on a physical downlink shared channel (PDSCH) or on a physical downlink control channel (PDCCH) of the first carrier or on the PDCCH of the second carrier.

9. The base station of claim 6, wherein the processing unit is arranged to:
   transmit the DL data over the first or the second carrier when it is determined that the second carrier should not be additionally used,
   wherein when the DL data is transmitted over the second carrier, the DL data is transmitted after the predetermined delay.

10. The base station of claim 9, wherein the processing unit is arranged to determine that the DL data should be carried over the second carrier when any one or more of the following is true:
- a channel quality of the second carrier is higher than a channel quality of the first carrier,
- a signal-to-interference ratio, SIR, of the second carrier is higher than a SIR of the first carrier,
- a received signal reference power, RSRP, of the second carrier is higher than a RSRP of the first carrier,
- a data transmission rate of the second carrier is higher than a data transmission rate of the first carrier,
- an error rate of the second carrier is lower than an error rate of the first carrier, and
- a remaining data carrying capacity of the second carrier is more than a remaining data carrying capacity of the first carrier.

11. A method in a user equipment of a wireless network for receiving download (DL) data from a base station of the wireless network, the method comprising:
- establishing, by the user equipment, a connection over a first carrier, wherein the first carrier is used by the base station to provide control signals to the user equipment;
- receiving a notification from the base station over the first carrier, the notification including an identification of a second carrier;
- whether the base station will additionally use a second carrier to transfer the DL data based on the notification; and
- receiving the DL data over the first and second carriers when it is determined that the base station will additionally use the second carrier,
- wherein a first data part of the DL data is received over the first carrier, and after a predetermined delay, a second data part of the DL data is received over the second carrier, and
- wherein the predetermined delay is an amount of time sufficient for the user equipment to prepare to receive over the second carrier.

12. The method of claim 11, further comprising:
- making a determination whether the base station will alternately use the second carrier to transfer the DL data based on the notification;
- receiving the DL data over the second carrier after the predetermined delay when it is determined that the base station will alternately use the second carrier; and
- receiving the DL data over the first carrier when it is determined that the base station will not alternately use the second carrier.

13. The method of claim 11, wherein the notification includes information regarding resource blocks, RBs, of the second carrier allocated for DL data carried over the first carrier or over the second carrier, and
- wherein the information regarding the RBs is provided on a physical downlink shared channel (PDSCH) or on a physical downlink control channel (PDCCH) of the first carrier or on the PDCCH of the second carrier.

14. The method of claim 11, wherein the second carrier is not used by the base station to provide control signals to the user equipment.

15. A user equipment in a wireless network capable of communicating with a base station over plural carriers, comprising:
- a communications unit arranged to communicate with the base station; and
- a processing unit arranged to:
- establish, via the communications unit, a connection over a first carrier, wherein the first carrier is used by the base station to provide control signals to user equipment;
- receive, via the communications unit, a notification from the base station over the first carrier, the notification including an identification of a second carrier carried over the first carrier;
- make a determination whether the base station will additionally use a second carrier to transfer download (DL) data based on the notification; and
- receive, via the communications unit, the DL data over the first and second carriers when it is determined that the base station will additionally use the second carrier,
- wherein a first data part of the DL data is received over the first carrier, and after a predetermined delay, a second data part of the DL data is received over the second carrier, and
- wherein the predetermined delay is an amount of time sufficient for the user equipment to prepare to receive over the second carrier.

16. The user equipment of claim 15, wherein the processing unit is arranged to:
- make a determination whether the base station will alternately use the second carrier to transfer the DL data based on the notification;
- receive, via the communications unit, the DL data over the second carrier after the predetermined delay when it is determined that the base station will alternately use the second carrier; and
- receive, via the communications unit, the DL data over the first carrier when it is determined that the base station will not alternately use the second carrier.

17. The user equipment of claim 15, wherein the notification includes information regarding resource blocks, RBs, of the second carrier allocated for DL data carried over the first carrier or over the second carrier, and
- wherein the information regarding the RBs is provided on a Physical downlink shared channel (PDSCH) or on a physical downlink control channel (PDCCH) of the first carrier or on the PDCCH of the second carrier.

18. The user equipment of claim 15, wherein the second carrier is not used by the base station to provide control signals to the user equipment.

* * * * *